(12) United States Patent
Luo

(10) Patent No.: US 6,211,313 B1
(45) Date of Patent: Apr. 3, 2001

(54) IRON-BASED CATALYST COMPOSITION AND PROCESS FOR PRODUCING CONJUGATED DIENE POLYMERS

(75) Inventor: Steven Luo, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/439,861

(22) Filed: Nov. 12, 1999

(51) Int. Cl.$^7$ .................. C08F 36/04; C08F 4/80
(52) U.S. Cl. .............. 526/139; 526/169.1; 526/335; 502/117; 502/121; 502/155
(58) Field of Search ............... 526/139, 169.1, 526/172; 502/117, 121, 154, 155

(56) References Cited

U.S. PATENT DOCUMENTS

| | | | |
|---|---|---|---|
| 3,419,505 | 12/1968 | Marsico | 260/2 |
| 3,457,186 | 7/1969 | Marsico | 252/429 |
| 3,498,963 | 3/1970 | Ichikawa et al. | 260/94.3 |
| 3,725,373 | 4/1973 | Yoo | 260/88.7 R |
| 3,778,424 | 12/1973 | Sugiura et al. | 260/94.3 |
| 3,957,894 | 5/1976 | Saeki et al. | 260/666 |
| 4,048,418 | 9/1977 | Throckmorton | 526/138 |
| 4,168,357 | 9/1979 | Throckmorton et al. | 526/139 |
| 4,168,374 | 9/1979 | Throckmorton et al. | 526/139 |
| 4,182,813 | 1/1980 | Makino et al. | 526/92 |
| 4,285,833 * | 8/1981 | Beck et al. | 526/139 X |
| 4,379,889 | 4/1983 | Ashitaka et al. | 525/247 |
| 4,751,275 | 6/1988 | Witte et al. | 526/139 |
| 5,239,023 | 8/1993 | Hsu et al. | 526/141 |
| 5,283,294 | 2/1994 | Hsu et al. | 525/247 |
| 5,356,997 | 10/1994 | Massie, II et al. | 525/237 |
| 5,677,405 | 10/1997 | Goodall et al. | 526/281 |
| 5,891,963 | 4/1999 | Brookhart et al. | 525/326.1 |
| 5,919,875 | 7/1999 | Luo et al. | 526/139 |

OTHER PUBLICATIONS

Abstract of Japanese Patent No. 48–6939.
Abstract of Japanese Patent No. 48–64178.
Syndiotactic 1,2–Polybutadiene with Co–CS$_2$ Catalyst System I. Preparation Properties and Application of Highly Crystalline Syndiotactic 1,2–Polybutadiene, II. Catalyst for Stereospecific Polymerization of Butadiene to Syndiotactic 1,2–Polybutadiene, III. $^1$H and $^{13}$C–NMR Study of Highly Syndiotactic 1,2 –Polybutadiene and IV Mechanism of Syndiotactic Polymerization of Butadiene with Cobalt Compounds–Organoaluminum–CS$_2$, *Journal of Polymer Science: Polymer Chemistry Edition*, by H. Ashitaka et al., vol. 21, pp. 1853–1860 and 1951–1995, (1983).

"Conjugated Diene Polymerization," Comprehensive Polymer Science, by Porri and Giarrusso, Pergamon Press, Oxford, vol. 4, pp. 53, (1989).

U.S. Patent Application Serial No. 09/088,611, filed on Jun. 1, 1998.

U.S. Patent Application Serial No. 08/996,656, filed on Dec. 23, 1997.

U.S. Patent Application Serial No. 09/173,956, filed on Oct. 14, 1998.

U.S. Patent Application Serial No. 09/172,305, filed on Oct. 14, 1998.

U.S. Patent Application Serial No. 09/172,346, filed on Oct. 14, 1998.

U.S. Patent Application Serial No. 09/328,549, filed on Jun. 9, 1999.

U.S. Patent Application Serial No. 09/434,669, filed on Nov. 5, 1999.

U.S. Patent Application Serial No. 09/434,627, filed on Nov. 5, 1999.

U.S. Patent Application Serial No. 09/475,343, filed on Dec. 30, 1999.

U.S. Patent Application Serial No. 09/475,345, filed on Dec. 30, 1999.

U.S. Patent Application Serial No. 09/475,547, filed on Dec. 30, 1999.

U.S. Patent Application Serial No. 09/475,723, filed on Dec. 30, 1999.

Abstract of Japanese Patent No. 45011154.

Ricci, et al, "Polymerization of Conjugated Alkadienes with Transition Metal Catalysts . . . ," Polymer Commun., 32(17), 514–517, Jun. 1991.*

* cited by examiner

Primary Examiner—Fred Teskin
(74) Attorney, Agent, or Firm—David G. Burleson; Arthur M. Reginelli

(57) ABSTRACT

A catalyst composition that is the combination of or the reaction product of ingredients including an iron-containing compound, a hydrogen phosphite, and an aluminoxane. This catalyst composition is useful for polymerizing conjugated diene monomers and is particularly useful for polymerizing 1,3-butadiene into syndiotactic 1,2-polybutadiene.

20 Claims, No Drawings

IRON-BASED CATALYST COMPOSITION AND PROCESS FOR PRODUCING CONJUGATED DIENE POLYMERS

TECHNICAL FIELD

The present invention generally relates to a catalyst composition for use in polymerizing conjugated dienes. More particularly, the present invention is directed toward an iron-based catalyst composition that is formed by combining an iron-containing compound, a hydrogen phosphite, and an aluminoxane. Advantageously, the iron-based catalyst composition of this invention can be used to polymerize 1,3-butadiene into syndiotactic 1,2-polybutadiene.

BACKGROUND OF THE INVENTION

Syndiotactic 1,2-polybutadiene is a crystalline thermoplastic resin that has a stereoregular structure in which the side chain vinyl groups are located alternately on the opposite sides in relation to the polymeric main chain. Syndiotactic 1,2-polybutadiene is a unique material that exhibits the properties of both plastics and rubber, and therefore it has many uses. For example, films, fibers, and various molded articles can be made utilizing syndiotactic 1,2-polybutadiene. It can also be blended into and co-cured with natural or synthetic rubbers.

Syndiotactic 1,2-polybutadiene can be made by solution, emulsion, or suspension polymerization. Generally, syndiotactic 1,2-polybutadiene has a melting temperature within the range of about 195° C. to about 215° C., but due to processability considerations, it is generally desirable for syndiotactic 1,2-polybutadiene to have a melting temperature of less than about 195° C.

Various transition metal catalyst systems based on cobalt, titanium, vanadium, chromium, and molybdenum for the preparation of syndiotactic 1,2-polybutadiene have been reported. The majority of these catalyst systems, however, have no practical utility because they have low catalytic activity or poor stereoselectivity, and in some cases they produce low molecular weight polymers or partially crosslinked polymers unsuitable for commercial use.

The following two cobalt-based catalyst systems are well known for the preparation of syndiotactic 1,2-polybutadiene on a commercial scale: (1) a catalyst system containing cobalt bis(acetylacetonate), triethylaluminum, water, and triphenylphosphine (U.S. Pat. Nos. 3,498,963 and 4,182,813), and (2) a catalyst system containing cobalt tris (acetylacetonate), triethylaluminum, and carbon disulfide (U.S. Pat. No. 3,778,424). These cobalt-based catalyst systems also have serious disadvantages.

The first cobalt catalyst system referenced above yields syndiotactic 1,2-polybutadiene having very low crystallinity. Also, this catalyst system develops sufficient catalytic activity only when halogenated hydrocarbon solvents are used as the polymerization medium, and halogenated solvents present toxicity problems.

The second cobalt catalyst system referenced above uses carbon disulfide as one of the catalyst components. Because of its low flash point, obnoxious smell, high volatility, and toxicity, carbon disulfide is difficult and dangerous to use, and requires expensive safety measures to prevent even minimal amounts escaping into the atmosphere. Furthermore, the syndiotactic 1,2-polybutadiene produced with this cobalt catalyst system has a very high melting temperature of about 200–210° C., which makes it difficult to process the polymer. Although the melting temperature of the syndiotactic 1,2-polybutadiene produced with this cobalt catalyst system can be reduced by employing a catalyst modifier as a fourth catalyst component, the presence of this catalyst modifier has adverse effects on the catalyst activity and polymer yields. Accordingly, many restrictions are required for the industrial utilization of these cobalt-based catalyst systems.

Coordination catalyst systems based on iron-containing compounds, such as the combination of iron(III) acetylacetonate and triethylaluminum, have been known for some time, but they have shown very low catalytic activity and poor stereoselectivity for the polymerization of conjugated dienes. The product mixture often contains oligomers, low molecular weight liquid polymers, and partially crosslinked polymers. Therefore, these iron-based catalyst systems have no industrial utility.

Because syndiotactic 1,2-polybutadiene is useful and the catalysts known heretofore in the art have many shortcomings, it would be advantageous to develop a new and significantly improved catalyst composition that has high catalytic activity and stereoselectivity for polymerizing 1,3-butadiene into syndiotactic 1,2-polybutadiene.

SUMMARY OF THE INVENTION

In general, the present invention provides a catalyst composition that is the combination of or the reaction product of ingredients comprising an iron-containing compound, a hydrogen phosphite, and an aluminoxane.

The present invention also provides a catalyst composition formed by a process comprising the step of combining an iron-containing compound, a hydrogen phosphite compound, and an aluminoxane.

The present invention also provides a process for preparing conjugated diene polymers, comprising the step of polymerizing conjugated diene monomers in the presence of a catalytically effective amount of a catalyst composition formed by combining an iron-containing compound, a hydrogen phosphite, and an aluminoxane.

The present invention also provides a process for preparing syndiotactic 1,2-polybutadiene, comprising the step of polymerizing 1,3-butadiene in the presence of a catalytically effective amount of a catalyst composition formed by combining an iron-containing compound, a hydrogen phosphite, and an aluminoxane.

The present invention also provides a conjugated diene polymer that is prepared by polymerizing conjugated diene monomers with a catalyst composition formed by a process comprising the step of combining an iron-containing compound, a hydrogen phosphite, and an aluminoxane.

The present invention further provides a syndiotactic 1,2-polybutadiene polymer that is prepared by polymerizing 1,3-butadiene with a catalyst composition formed by a process comprising the step of combining an iron-containing compound, a hydrogen phosphite, and an aluminoxane.

Advantageously, the catalyst composition of the present invention has very high catalytic activity and stereoselectivity for polymerizing conjugated diene monomers such as 1,3-butadiene. This activity and selectivity, among other advantages, allows syndiotactic 1,2-polybutadiene to be produced in very high yields with low catalyst levels after relatively short polymerization times. Significantly, the catalyst composition of this invention is very versatile and capable of producing syndiotactic 1,2-polybutadiene with a wide range of melting temperatures without the need for a catalyst modifier that may have adverse effects on the catalyst activity and polymer yields. In addition, the catalyst composition of this invention does not contain carbon disulfide. Therefore, the toxicity, objectionable smell, dangers, and expense associated with the use of carbon disulfide are eliminated. Further, the catalyst composition of this invention is iron-based, and iron compounds are generally stable, inexpensive, relatively innocuous, and readily available. Furthermore, the catalyst composition of this invention has high catalytic activity in a wide variety of solvents including the environmentally-preferred nonhalogenated solvents such as aliphatic and cycloaliphatic hydrocarbons.

DETAILED DESCRIPTION OF ILLUSTRATIVE EMBODIMENTS

The present invention is generally directed toward an iron-based catalyst composition, methods of using this catalyst composition for polymerizing conjugated dienes, and the resulting polymers. It has now been found that conjugated dienes can be efficiently polymerized with an iron-based catalyst composition including an iron-containing compound, a hydrogen phosphite, and an aluminoxane. In particular, 1,3-butadiene can be efficiently polymerized into syndiotactic 1,2-polybutadiene by using this catalyst composition.

The catalyst composition of the present invention is formed by combining (a) an iron-containing compound, (b) a hydrogen phosphite, and (c) an aluminoxane. In addition to the three catalyst ingredients (a), (b), and (c), other organometallic compounds or Lewis bases can also be added, if desired.

Various iron-containing compounds or mixtures thereof can be employed as ingredient (a) of the catalyst composition of this invention. It is generally advantageous to employ iron-containing compounds that are soluble in a hydrocarbon solvent such as aromatic hydrocarbons, aliphatic hydrocarbons, or cycloaliphatic hydrocarbons. Hydrocarbon-insoluble iron-containing compounds, however, can be suspended in the polymerization medium to form the catalytically active species and are therefore also useful.

The iron atom in the iron-containing compounds can be in various oxidation states including, but not limited to, the 0, +2, +3, and +4 oxidation states. It is preferable to use divalent iron compounds (also called ferrous compounds), wherein the iron is in the +2 oxidation state, and trivalent iron compounds (also called ferric compounds), wherein the iron is in the +3 oxidation state. Suitable types of iron-containing compounds that can be utilized include, but are not limited to, iron carboxylates, iron carbamates, iron dithiocarbamates, iron xanthates, iron β-diketonates, iron alkoxides or aryloxides, and organoiron compounds.

Some specific examples of suitable iron carboxylates include iron(II) formate, iron(III) formate, iron(II) acetate, iron(III) acetate, iron(II) acrylate, iron(III) acrylate, iron(II) methacrylate, iron(III) methacrylate, iron(II) valerate, iron (III) valerate, iron(II) gluconate, iron(III) gluconate, iron(II) citrate, iron(III) citrate, iron(II) fumarate, iron(III) fumarate, iron(II) lactate, iron(III) lactate, iron(II) maleate, iron(III) maleate, iron(II) oxalate, iron(III) oxalate, iron(II) 2-ethylhexanoate, iron(III) 2-ethylhexanoate, iron(II) neodecanoate, iron(III) neodecanoate, iron(II) naphthenate, iron(III) naphthenate, iron(II) stearate, iron(III) stearate, iron(II) oleate, iron(III) oleate, iron(II) benzoate, iron(III) benzoate, iron(II) picolinate, and iron(III) picolinate.

Some specific examples of suitable iron carbamates include iron(II) dimethylcarbamate, iron(III) dimethylcarbamate, iron(II) diethylcarbamate, iron(III) diethylcarbamate, iron(II) diisopropylcarbamate, iron(III) diisopropylcarbamate, iron(II) dibutylcarbamate, iron(III) dibutylcarbamate, iron(II) dibenzylcarbamate, and iron(III) dibenzylcarbamate.

Some specific examples of suitable iron dithiocarbamates include iron (II) dimethyldithiocarbamate, iron (III) dimethyldithiocarbamate, iron (II) diethyldithiocarbamate, iron(III) diethyldithiocarbamate, iron(II) diisopropyldithiocarbamate, iron(III) diisopropyldithiocarbamate, iron(II) dibutyldithiocarbamate, iron(III) dibutyldithiocarbamate, iron(II) dibenzyldithiocarbamate, and iron(III) dibenzyldithiocarbamate.

Some specific examples of suitable iron xanthates include iron(II) methylxanthate, iron(III) methylxanthate, iron(II) ethylxanthate, iron(III) ethylxanthate, iron(II) isopropylxanthate, iron(III) isopropylxanthate, iron(II) butylxanthate, iron(III) butylxanthate, iron(II) benzylxanthate, and iron(III) benzylxanthate.

Some specific examples of suitable iron β-diketonates include iron(II) acetylacetonate, iron(III) acetylacetonate, iron(II) trifluoroacetylacetonate, iron(III) trifluoroacetylacetonate, iron(II) hexafluoroacetylacetonate, iron(III) hexafluoroacetylacetonate, iron(II) benzoylacetonate, iron(III) benzoylacetonate, iron(II) 2,2,6,6-tetramethyl-3,5-heptanedionate, and iron(III) 2,2,6,6-tetramethyl-3,5-heptanedionate.

Some specific examples of suitable iron alkoxides or aryloxides include iron(II) methoxide, iron(III) methoxide, iron(II) ethoxide, iron(III) ethoxide, iron(II) isopropoxide, iron(III) isopropoxide, iron(II) 2-ethylhexoxide, iron(III) 2-ethylhexoxide, iron(II) phenoxide, iron(III) phenoxide, iron(II) nonylphenoxide, iron(III) nonylphenoxide, iron(II) naphthoxide, and iron(III) naphthoxide.

The term organoiron compound refers to any iron compound containing at least one covalent iron-carbon bond. Some specific examples of suitable organoiron compounds include bis(cyclopentadienyl)iron(II) (also called ferrocene), bis(pentamethylcyclopentadienyl)iron(II) (also called decamethylferrocene), bis(pentadienyl)iron(II), bis(2,4-dimethylpentadienyl)iron(II), bis(allyl)dicarbonyliron(II), (cyclopentadienyl)(pentadienyl)iron(II), tetra(1-norbornyl)iron(IV), (trimethylenemethane)tricarbonyliron(II), bis (butadiene)carbonyliron(0), butadienetricarbonyliron(0), and bis(cyclooctatetraene)iron(0).

Useful hydrogen phosphite compounds that can be employed as ingredient (b) of the catalyst composition of this invention are acyclic hydrogen phosphites, cyclic hydrogen phosphites, and mixtures thereof.

In general, the acyclic hydrogen phosphites may be represented by the following keto-enol tautomeric structures:

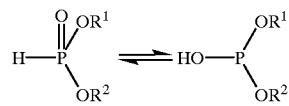

Where $R^1$ and $R^2$, which may be the same or different, are mono-valent organic groups. Preferably, $R^1$ and $R^2$ are hydrocarbyl groups such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form these groups, up to 20 carbon atoms. These hydrocarbyl groups may contain heteroatoms such as, but not limited to, nitrogen, oxygen, silicon, sulfur, and phosphorus atoms. The acyclic hydrogen phosphites exist mainly as the keto tautomer (shown on the left), with the enol tautomer (shown on the right) being the minor species. The equilibrium constant for the above-mentioned tautomeric equilibrium is dependent upon factors such as the temperature, the types of $R^1$ and $R^2$ groups, the type of solvent, and the like. Both tautomers may be associated in dimeric, trimeric, or oligomeric forms by hydrogen bonding. Either of the two tautomers or mixtures thereof can be employed.

Some representative and non-limiting examples of suitable acyclic hydrogen phosphites are dimethyl hydrogen phosphite, diethyl hydrogen phosphite, dibutyl hydrogen phosphite, dihexyl hydrogen phosphite, dioctyl hydrogen phosphite, didecyl hydrogen phosphite, didodecyl hydrogen phosphite, dioctadecyl hydrogen phosphite, bis(2,2,2-trifluoroethyl)hydrogen phosphite, diisopropyl hydrogen phosphite, bis(3,3-dimethyl-2-butyl)hydrogen phosphite, bis(2,4-dimethyl-3-pentyl)hydrogen phosphite, di-t-butyl hydrogen phosphite, bis(2-ethylhexyl)hydrogen phosphite, dineopentyl hydrogen phosphite, bis(cyclopropylmethyl) hydrogen phosphite, bis(cyclobutylmethyl)hydrogen phosphite, bis(cyclopentylmethyl)hydrogen phosphite, bis (cyclohexylmethyl)hydrogen phosphite, dicyclobutyl hydrogen phosphite, dicyclopentyl hydrogen phosphite, dicyclohexyl hydrogen phosphite, dimethyl hydrogen phosphite, diphenyl hydrogen phosphite, dinaphthyl hydrogen phosphite, dibenzyl hydrogen phosphite, bis(1-naphthylmethyl)hydrogen phosphite, diallyl hydrogen phosphite, dimethallyl hydrogen phosphite, dicrotyl hydrogen phosphite, ethyl butyl hydrogen phosphite, methyl hexyl hydrogen phosphite, methyl neopentyl hydrogen phosphite, methyl phenyl hydrogen phosphite, methyl cyclohexyl hydrogen phosphite, methyl benzyl hydrogen phosphite, and the like. Mixtures of the above dihydrocarbyl hydrogen phosphites may also be utilized.

In general, cyclic hydrogen phosphites contain a divalent organic group that bridges between the two oxygen atoms that are singly-bonded to the phosphorus atom. These cyclic hydrogen phosphites may be represented by the following keto-enol tautomeric structures:

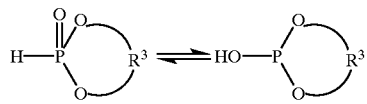

where $R^3$ is a divalent organic group. Preferably, $R^3$ is a hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form these groups, up to 20 carbon atoms. These hydrocarbylene groups may contain heteroatoms such as, but not limited to, nitrogen, oxygen, silicon, sulfur, and phosphorus atoms. The cyclic hydrogen phosphites exist mainly as the keto tautomer (shown on the left), with the enol tautomer (shown on the right) being the minor species. The equilibrium constant for the above-mentioned tautomeric equilibrium is dependent upon factors such as the temperature, the types of $R^3$ group, the type of solvent, and the like. Both tautomers may be associated in dimeric, trimeric, or oligomeric forms by hydrogen bonding. Either of the two tautomers or mixtures thereof can be used.

The cyclic hydrogen phosphites may be synthesized by the transesterification reaction of an acyclic dihydrocarbyl hydrogen phosphite (usually dimethyl hydrogen phosphite or diethyl hydrogen phosphite) with an alkylene diol or an arylene diol. Procedures for this transesterification reaction are well known to those skilled in the art. Typically, the transesterification reaction is carried out by heating a mixture of an acyclic dihydrocarbyl hydrogen phosphite and an alkylene diol or an arylene diol. Subsequent distillation of the side-product alcohol (usually methanol or ethanol) that results from the transesterification reaction leaves the new-made cyclic hydrogen phosphite.

Some specific examples of suitable cyclic alkylene hydrogen phosphites are 2-oxo-(2H)-5-butyl-5-ethyl-1,3,2-dioxaphosphorinane, 2-oxo-(2H)-5,5-dimethyl-1,3,2-dioxaphosphorinane, 2-oxo-(2H)-1,3,2-dioxaphosphorinane, 2-oxo-(2H)-4-methyl-1,3,2-dioxaphosphorinane, 2-oxo-(2H)-5-ethyl-5-methyl-1,3,2-dioxaphosphorinane, 2-oxo-(2H)-5,5-diethyl-1,3,2-dioxaphosphorinane, 2-oxo-(2H)-5-methyl-5-propyl-1,3,2-dioxaphosphorinane, 2-oxo-(2H)-4-isopropyl-5,5-dimethyl-1,3,2-dioxaphosphorinane, 2-oxo-(2H)-4,6-dimethyl-1,3,2-dioxaphosphorinane, 2-oxo-(2H)-4-propyl-5-ethyl-1,3,2-dioxaphosphorinane, 2-oxo-(2H)-4-methyl-1,3,2-dioxaphospholane, 2-oxo-(2H)-4,5-dimethyl-1,3,2-dioxaphospholane, 2-oxo-(2H)-4,4,5,5-tetramethyl-1,3,2-dioxaphospholane, and the like. Mixtures of the above cyclic alkylene hydrogen phosphites may also be utilized.

Some specific examples of suitable cyclic arylene hydrogen phosphites are 2-oxo-(2H)-4,5-benzo-1,3,2-dioxaphospholane, 2-oxo-(2H)-4,5-(3'-methylbenzo)-1,3,2-dioxaphospholane, 2-oxo-(2H)-4,5-(4'-methylbenzo)-1,3,2-dioxaphospholane, 2-oxo-(2H)-4,5-(4'-tert-butylbenzo)-1,3,2-dioxaphospholane, 2-oxo-(2H)-4,5-naphthalo-1,3,2-dioxaphospholane, and the like. Mixtures of the above cyclic arylene hydrogen phosphites may also be utilized.

Ingredient (c) of the catalyst composition of the present invention comprises an aluminoxane. Aluminoxanes are well known in the art and comprise oligomeric acyclic aluminoxanes that can be represented by the general formula:

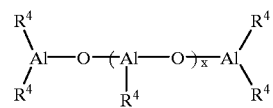

and oligomeric cyclic aluminoxanes that can be represented by the general formula:

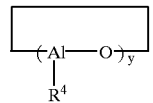

where x is an integer of 1 to about 100, preferably about 10 to about 50; y is an integer of 2 to about 100, preferably about 3 to about 20; and each $R^4$, which may be the same or different, is a mono-valent organic group. Preferably, each $R^4$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form these groups, up to about 20 carbon atoms. These hydrocarbyl groups may contain heteroatoms such as, but not limited to, nitrogen, oxygen, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

In general, aluminoxanes can be prepared by reacting trihydrocarbylaluminum compounds with water. This reaction can be performed according to known methods, such as (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is added to the monomer or monomer solution that is to be polymerized, and then water is added.

Some specific examples of suitable aluminoxane compounds that can be utilized as ingredient (c) in this invention include methylaluminoxane (MAO), modified methylaluminoxane (MMAO), ethylaluminoxane, butylaluminoxane, isobutylaluminoxane, and the like, and mixtures thereof. Isobutylaluminoxane is particularly useful on the grounds of its availability and its solubility in aliphatic and cycloaliphatic hydrocarbon solvents. Modified methylaluminoxane can be formed by substituting about 20–80% of the methyl groups of methylaluminoxane with $C_2$ to $C_{12}$ hydrocarbyl groups, preferably with isobutyl groups, by using techniques known to those skilled in the art.

The catalyst composition of this invention has a very high catalytic activity over a wide range of total catalyst concentrations and catalyst ingredient ratios. The polymers having the most desirable properties, however, are obtained within a narrower range of total catalyst concentrations and catalyst ingredient ratios. Further, it is believed that the three catalyst ingredients (a), (b), and (c) can interact or react to form an active catalyst species. Accordingly, the optimum concentration for any one catalyst ingredient is dependent upon the concentrations of the other catalyst ingredients. The molar ratio of the hydrogen phosphite to the iron-containing compound (P/Fe) can be varied from about 0.5:1 to about 50:1, more preferably from about 1:1 to about 25:1, and even more preferably from about 2:1 to about 10:1. The molar ratio of the aluminoxane to the iron-containing compound (Al/Fe) can be varied from about 1:1 to about 200:1, more preferably from about 5:1 to about 100:1, and even more preferably from about 10:1 to about 50:1.

As discussed above, the catalyst composition of the present invention is preferably formed by combining the three catalyst ingredients (a), (b), and (c). Although an active catalyst species is believed to result from this combination, the degree of interaction or reaction between the various ingredients or components is not known with any great degree of certainty. Therefore, it should be understood that the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition of the present invention can be formed by combining or mixing the catalyst ingredients or components by using, for example, one of the following methods:

First, the catalyst composition may be formed in situ by adding the three catalyst ingredients to a solution containing monomer and solvent, or simply bulk monomer, in either a stepwise or simultaneous manner. When adding the catalyst ingredients in a stepwise manner, the sequence in which the ingredients are added is not critical. Preferably, however, the iron-containing compound is added first, followed by the hydrogen phosphite, and finally followed by the aluminoxane.

Second, the three catalyst ingredients may be pre-mixed outside the polymerization system at an appropriate temperature, which is generally from about −20° C. to about 80° C., and the resulting catalyst composition is then added to the monomer solution.

Third, the catalyst composition may be pre-formed in the presence of monomer. That is, the three catalyst ingredients are pre-mixed in the presence of a small amount of monomer at an appropriate temperature, which is generally from about −20° C. to about 80° C. The amount of monomer that is used for the catalyst pre-forming can range from about 1 to about 500 moles per mole of the iron-containing compound, and preferably should be from about 4 to about 100 moles per mole of the iron-containing compound. The resulting catalyst composition is then added to the remainder of the monomer that is to be polymerized.

Fourth, the catalyst composition may be formed by using a two-stage procedure. The first stage involves reacting the iron-containing compound with the aluminoxane in the presence of a small amount of monomer at an appropriate temperature, which is generally from about −20° C. to about 80° C. In the second stage, the foregoing reaction mixture and the hydrogen phosphite are charged in either a stepwise or simultaneous manner to the remainder of the monomer that is to be polymerized.

Fifth, an alternative two-stage procedure may also be employed. An iron-ligand complex is first formed by pre-combining the iron-containing compound with the hydrogen phosphite. Once formed, this iron-ligand complex is then combined with the aluminoxane to form the active catalyst species. The iron-ligand complex can be formed separately or in the presence of the monomer that is to be polymerized. This complexation reaction can be conducted at any convenient temperature at normal pressure, but for an increased rate of reaction, it is preferable to perform this reaction at room temperature or above. The temperature and time used for the formation of the iron-ligand complex will depend upon several variables including the particular starting materials and the solvent employed. Once formed, the iron-ligand complex can be used without isolation from the complexation reaction mixture. If desired, however, the iron-ligand complex may be isolated from the complexation reaction mixture before use.

When a solution of the iron-based catalyst composition or one or more of the catalyst ingredients is prepared outside the polymerization system as set forth in the foregoing methods, an organic solvent or carrier is preferably employed. It is generally desirable to select an organic solvent that is inert with respect to the catalyst composition or ingredients. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used. For environmental reasons, aliphatic and cycloaliphatic solvents are highly preferred. The foregoing organic solvents may serve to dissolve the catalyst composition or ingredients, or the solvent may simply serve as a carrier in which the catalyst composition or ingredients may be suspended.

As described above, the catalyst composition of the present invention exhibits a very high catalytic activity for the polymerization of conjugated dienes. Hence, the present invention further provides a process for producing conjugated diene polymers with the catalyst composition of this invention. Some specific examples of conjugated dienes that can be polymerized by means of the catalyst composition of the present invention include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene. Mixtures of two or more conjugated dienes may also be utilized in co-polymerization. The preferred conjugated dienes are 1,3-butadiene, isoprene, 1,3-pentadiene, and 1,3-hexadiene. The most preferred conjugated diene is 1,3-butadiene inasmuch as the catalyst composition of this invention advantageously has very high catalytic activity and stereoselectivity for polymerizing 1,3-butadiene into syndiotactic 1,2-polybutadiene.

The production of conjugated diene polymers, such as syndiotactic 1,2-polybutadiene, according to this invention is accomplished by polymerizing conjugated diene monomers in the presence of a catalytically effective amount of the foregoing catalyst composition. There are available a variety of methods for bringing the ingredients of the catalyst composition into contact with conjugated diene monomers as described above. To understand what is meant by a catalytically effective amount, it should be understood that the total catalyst concentration to be employed in the polymerization mass depends on the interplay of various factors such as the purity of the ingredients, the polymerization temperature, the polymerization rate and conversion desired, and many other factors. Accordingly, specific total catalyst concentration cannot be definitively set forth except to say that catalytically effective amounts of the respective catalyst ingredients should be used. Generally, the amount of the iron-containing compound used can be varied from about 0.01 to about 2 mmol per 100 g of conjugated diene monomers, with a more preferred range being from about 0.02 to about 1.0 mmol per 100 g of conjugated diene monomers, and a most preferred range being from about 0.05 to about 0.5 mmol per 100 g of conjugated diene monomers.

The polymerization of conjugated diene monomers according to this invention is preferably carried out in an organic solvent as the diluent. Accordingly, a solution polymerization system may be employed in which both the monomer to be polymerized and the polymer formed are soluble in the polymerization medium. Alternatively, a precipitation polymerization system may be employed by choosing a solvent in which the polymer formed is insoluble. In both cases, an amount of the organic solvent in addition to the organic solvent that may be used in preparing the iron-based catalyst composition is usually added to the polymerization system. The additional organic solvent may be either the same as or different from the organic solvent contained in the catalyst solutions. It is normally desirable to select an organic solvent that is inert with respect to the catalyst composition employed to catalyze the polymerization. Suitable types of organic solvents that can be utilized as the diluent include, but are not limited to, aliphatic, cycloaliphatic, and aromatic hydrocarbons. Some representative examples of suitable aliphatic solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. Some representative examples of suitable cycloaliphatic solvents include cyclopentane, cyclohexane, methylcyclopentane, methylcyclohexane, and the like. Some representative examples of suitable aromatic solvents include benzene, toluene, xylenes, ethylbenzene, diethylbenzene, mesitylene, and the like. Commercial mixtures of the above hydrocarbons may also be used. For environmental reasons, aliphatic and cycloaliphatic solvents are highly preferred.

The concentration of conjugated diene monomers to be polymerized is not limited to a special range. Generally, however, it is preferred that the concentration of the monomers present in the polymerization medium at the beginning of the polymerization be in a range of from about 3% to about 80% by weight, more preferably from about 5% to about 50% by weight, and even more preferably from about 10% to about 30% by weight.

The polymerization of conjugated diene monomers according to this invention may also be carried out by means of bulk polymerization, which refers to a polymerization environment where no solvents are employed. Bulk polymerization can be conducted either in a condensed liquid phase or in a gas phase.

In performing the polymerization of conjugated diene monomers according to this invention, a molecular weight regulator may be employed to control the molecular weight of the conjugated diene polymers to be produced. As a result, the scope of the polymerization system can be expanded in such a manner that it can be used for the production of conjugated diene polymers having a wide range of molecular weights. Suitable types of molecular weight regulators that can be utilized include, but are not limited to, α-olefins such as ethylene, propylene, 1-butene, 1-pentene, 1-hexene, 1-heptene, and 1-octene; accumulated diolefins such as allene and 1,2-butadiene; nonconjugated diolefins such as 1,6-octadiene, 5-methyl-1,4-hexadiene, 1,5-cyclooctadiene, 3,7-dimethyl-1,6-octadiene, 1,4-cyclohexadiene, 4-vinylcyclohexene, 1,4-pentadiene, 1,4-hexadiene, 1,5-hexadiene, 1,6-heptadiene, 1,2-divinylcyclohexane, 5-ethylidene-2-norbornene, 5-methylene-2-norbornene, 5-vinyl-2-norbornene, dicyclopentadiene, and 1,2,4-trivinylcyclohexane; acetylenes such as acetylene, methylacetylene and vinylacetylene; and mixtures thereof. The amount of the molecular weight regulator used, expressed in parts per hundred parts by weight of the conjugated diene monomers (phm), is from about 0.01 to about 10 phm, preferably from about 0.02 to about 2 phm, and more preferably from about 0.05 to about 1 phm.

The molecular weight of the conjugated diene polymers to be produced can also be effectively controlled by polymerizing conjugated diene monomers in the presence of hydrogen gas. In this case, the preferable partial pressure of hydrogen gas is within the range of about 0.01 to about 50 atmospheres.

The polymerization of conjugated diene monomers according to this invention may be carried out as a batch process, a continuous process, or even a semi-continuous process. In the semi-continuous process, monomer is intermittently charged as needed to replace that monomer already polymerized. In any case, the polymerization is desirably conducted under anaerobic conditions by using an inert protective gas such as nitrogen, argon or helium, with moderate to vigorous agitation. The polymerization temperature employed in the practice of this invention may vary widely from a low temperature, such as −10° C. or below, to a high temperature such as 100° C. or above, with a preferred temperature range being from about 20° C. to about 90° C. The heat of polymerization may be removed by external cooling, cooling by evaporation of the monomer or the solvent, or a combination of the two methods. Although the polymerization pressure employed may vary widely, a preferred pressure range is from about 1 atmosphere to about 10 atmospheres.

Once a desired conversion is achieved, the polymerization can be stopped by the addition of a polymerization terminator that inactivates the catalyst. Typically, the terminator employed is a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the terminator. The amount of the antioxidant employed is preferably in the range of 0.2% to 1% by weight of the polymer product. When the polymerization reaction has been stopped, the polymer can be recovered from the polymerization mixture by conventional procedures of desolventization and drying. For instance, the polymer may be isolated from the polymerization mixture by coagulation of the polymerization mixture with an alcohol such as methanol, ethanol, or isopropanol, or by steam distillation of the solvent and the unreacted monomer, followed by filtration. The polymer product is then dried to remove residual amounts of solvent and water.

As noted above, the preferred embodiment of this invention is directed toward a catalyst composition for polymerizing 1,3-butadiene into syndiotactic 1,2-polybutadiene. Advantageously, the catalyst composition of this invention can be manipulated to vary the characteristics of the resulting syndiotactic 1,2-polybutadiene. Namely, the syndiotactic 1,2-polybutadiene made utilizing the catalyst composition of this invention can have various melting temperatures, molecular weights, 1,2-linkage contents, and syndiotacticities, all of which are dependent upon selection of the catalyst ingredients and the ingredient ratios. As a general rule, the use of acyclic hydrogen phosphites in lieu of cyclic hydrogen phosphites will increase the melting temperature, molecular weight, 1,2-linkage content, and syndiotacticity of the syndiotactic 1,2-polybutadiene.

The syndiotactic 1,2-polybutadiene produced with the catalyst composition of this invention has many uses. It can be blended with various rubbers in order to improve the properties thereof. For example, it can be incorporated into elastomers in order to improve the green strength of those elastomers, particularly in tires. The supporting or reinforcing carcass of tires is particularly prone to distortion during tire building and curing procedures. For this reason, the incorporation of the syndiotactic 1,2-polybutadiene into rubber compositions that are utilized in the supporting carcass of tires has particular utility in preventing or minimizing this distortion. In addition, the incorporation of the syndiotactic 1,2-polybutadiene into tire tread compositions can reduce the heat build-up and improve the tear and wear characteristics of tires. The syndiotactic 1,2-polybutadiene is also useful in the manufacture of films and packaging materials and in many molding applications.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

GENERAL EXPERIMENTATION

Example 1

An oven-dried 1-liter glass bottle was capped with a self-sealing rubber liner and a perforated metal cap. After the bottle was thoroughly purged with a stream of dry nitrogen gas, the bottle was charged with 72 g of hexanes and 178 g of a 1,3-butadiene/hexanes blend containing 28.1% by weight of 1,3-butadiene. The following catalyst components were added to the bottle in the following order: (1) 0.050 mmol of iron(III) 2-ethylhexanoate, (2) 0.20 mmol of bis (2-ethylhexyl)hydrogen phosphite, and (3) 1.60 mmol of isobutylaluminoxane. The bottle was tumbled for 6 hours in a water bath maintained at 50° C. The polymerization was terminated by addition of 10 mL of isopropanol containing 1.0 g of 2,6-di-tert-butyl-4-methylphenol. The polymerization mixture was coagulated with 3 liters of isopropanol. The resulting syndiotactic 1,2-polybutadiene was isolated by filtration and dried to a constant weight under vacuum at 60° C. The yield of the polymer was 46.1 g (92%). As measured by differential scanning calorimetry (DSC), the polymer had a melting temperature of 187° C. The $^1$H and $^{13}$C nuclear magnetic resonance (NMR) analysis of the polymer indicated a 1,2-linkage content of 89% and a syndiotacticity of 91%. As determined by gel permeation chromatography (GPC), the polymer had a weight average molecular weight ($M_w$) of 1,113,000, a number average molecular weight ($M_n$) of 416,000, and a polydispersity index ($M_w/M_n$) of 2.7. The monomer charge, the amounts of the catalyst ingredients, and the properties of the resulting syndiotactic 1,2-polybutadiene are summarized in Table I.

TABLE I

| | Example No. | | | | |
|---|---|---|---|---|---|
| | 1 | 2 | 3 | 4 | 5 |
| Hexanes (g) | 72 | 72 | 72 | 72 | 72 |
| 28.1% 1,3-Bd/hexanes (g) | 178 | 178 | 178 | 178 | 178 |
| Fe(2-EHA)$_3$ (mmol) | 0.050 | 0.050 | 0.050 | 0.050 | 0.050 |
| HP(O)(OCH$_2$CH(Et)(CH$_2$)$_3$CH$_3$)$_2$ (mmol) | 0.20 | 0.20 | 0.20 | 0.20 | 0.20 |
| Isobutylaluminoxane (mmol) | 1.60 | 1.55 | 1.50 | 1.45 | 1.40 |
| Fe/P/Al molar ratio | 1:4:32 | 1:4:31 | 1:4:30 | 1:4:29 | 1:4:28 |
| Polymer yield (%) after 6 hr at 50° C. | 92 | 93 | 93 | 95 | 96 |
| Melting temperature (° C.) | 187 | 187 | 187 | 186 | 186 |
| $M_w$ | 1,113,000 | 982,000 | 975,000 | 934,000 | 911,000 |

TABLE I-continued

|  | Example No. | | | | |
| --- | --- | --- | --- | --- | --- |
|  | 1 | 2 | 3 | 4 | 5 |
| $M_n$ | 416,000 | 339,000 | 301,000 | 367,000 | 333 |
| $M_w/M_n$ | 2.7 | 2.9 | 3.2 | 2.5 | 2.7 |

Examples 2–5

In Examples 2–5, the procedure described in Example 1 was repeated except that the catalyst ingredient ratio was varied as shown in Table I. The monomer charge, the amounts of the catalyst ingredients, the polymer yields, and the properties of the resulting syndiotactic 1,2-polybutadiene produced in each example are summarized in Table I.

Examples 6–10

In Examples 6–10, the procedure described in Example 1 was repeated except that 2-oxo-(2H)-5-butyl-5-ethyl-1,3,2-dioxaphosphorinane was substituted for bis(2-ethylhexyl) hydrogen phosphite, and the catalyst ingredient ratio varied as shown in Table II. The monomer charge, the amounts of the catalyst ingredients, the polymer yields, and the properties of the syndiotactic 1,2-polybutadiene produced in each example are summarized in Table II. The $^1$H and $^{13}$C nuclear magnetic resonance (NMR) analysis of the polymer produced in Example 7 indicated a 1,2-linkage content of 80% and a syndiotacticity of 81%.

iron dithiocarbamate, iron xanthate, iron β-diketonate, iron alkoxide, iron aryloxide, organoiron compound, or a mixture thereof.

4. The catalyst composition of claim 1, where the hydrogen phosphite is an acyclic hydrogen phosphite defined by the following keto-enol tautomeric structures:

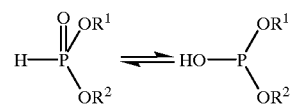

or a cyclic hydrogen phosphite defined by the following keto-enol tautomeric structures:

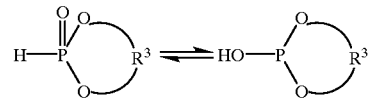

TABLE II

|  | Example No. | | | | |
| --- | --- | --- | --- | --- | --- |
|  | 6 | 7 | 8 | 9 | 10 |
| Hexanes (g) | 72 | 72 | 72 | 72 | 72 |
| 28.1% 1,3-Bd/hexanes (g) | 178 | 178 | 178 | 178 | 178 |
| Fe(2-EHA)$_3$ (mmol) | 0.10 | 0.10 | 0.10 | 0.10 | 0.10 |
| Cyclic hydrogen phosphite* (mmol) | 0.40 | 0.40 | 0.40 | 0.40 | 0.40 |
| Isobutylaluminoxane (mmol) | 3.10 | 3.20 | 3.30 | 3.40 | 3.50 |
| Fe/P/Al molar ratio | 1:4:31 | 1:4:32 | 1:4:33 | 1:4:34 | 1:4:35 |
| Polymer yield (%) after 6 hr at 50° C. | 86 | 94 | 92 | 92 | 93 |
| Melting temperature (° C.) | 158 | 159 | 158 | 157 | 157 |
| $M_w$ | 723,00 | 716,000 | 717,000 | 690,000 | 674,000 |
| $M_n$ | 277,000 | 303,000 | 299,000 | 288,000 | 315,000 |
| $M_w/M_n$ | 2.6 | 2.4 | 2.4 | 2.4 | 2.1 |

*2-Oxo-(2H)-5-butyl-5-ethyl-1,3,2-dioxaphorinane

Various modifications and alterations that do not depart from the scope and spirit of this invention will become apparent to those skilled in the art. This invention is not to be duly limited to the illustrative embodiments set forth herein.

What is claimed is:

1. A catalyst composition that is the combination of or the reaction product of ingredients comprising:
    (a) an iron-containing compound;
    (b) a hydrogen phosphite; and
    (c) an aluminoxane.

2. The catalyst composition of claim 1, where the iron atom in the iron-containing compound has an oxidation state of 0, +2, +3, or +4.

3. The catalyst composition of claim 1, where the iron-containing compound is an iron carboxylate, iron carbamate, or a mixture thereof, where $R^1$ and $R^2$, which may be the same or different, are mono-valent organic groups, and where $R^3$ is a divalent organic group.

5. The catalyst composition of claim 4, where $R^1$ and $R^2$, are alkyl, cycloalkyl, substituted cycloalkyl, alkenyl, cycloalkenyl, substituted cycloalkenyl, aryl, allyl, substituted aryl, aralkyl, alkaryl, or alkynyl groups, with each group containing up to about 20 carbon atoms, and where $R^3$ is a alkylene, cycloalkylene, substituted alkylene, substituted cycloalkylene, alkenylene, cycloalkenylene, substituted alkenylene, substituted cycloalkenylene, arylene, or substituted arylene group, with each group containing up to about 20 carbon atoms.

6. The catalyst composition of claim 1, where the aluminoxane is defined by one of the following formulas:

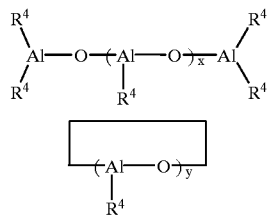

where x is an integer of 1 to about 100, y is an integer of 2 to about 100, and each $R^4$, which may be the same or different, is a mono-valent organic group.

7. The catalyst composition of claim 6, where each $R^4$ is an alkyl, cycloalkyl, substituted cycloalkyl, alkenyl, cycloalkenyl, substituted cycloalkenyl, aryl, allyl, substituted aryl, aralkyl, alkaryl, or alkynyl group, with each group containing up to about 20 carbon atoms.

8. The catalyst composition of claim 1, where the molar ratio of the hydrogen phosphite to the iron-containing compound is from about 0.5:1 to about 50:1, and the molar ratio of the aluminoxane to the iron-containing compound is from about 1:1 to about 200:1.

9. The catalyst composition of claim 8, where the molar ratio of the hydrogen phosphite to the iron-containing compound is from about 1:1 to about 25:1, and the molar ratio of the aluminoxane to the iron-containing compound is from about 5:1 to about 100:1.

10. A catalyst composition formed by a process comprising the step of combining:
(a) an iron-containing compound;
(b) a hydrogen phosphite; and
(c) an aluminoxane.

11. A process for preparing conjugated diene polymers comprising the step of:
polymerizing conjugated diene monomers in the presence of a catalytically effective amount of a catalyst composition formed by combining:
(a) an iron-containing compound;
(b) a hydrogen phosphite; and
(c) an aluminoxane.

12. The process of claim 11, where the iron-containing compound is an iron carboxylate, iron carbamate, iron dithiocarbamate, iron xanthate, iron β-diketonate, iron alkoxide, iron aryloxide, organoiron compound, or a mixture thereof.

13. The process of claim 11, where the hydrogen phosphite is an acyclic hydrogen phosphite defined by the following keto-enol tautomeric structures:

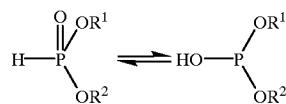

or a cyclic hydrogen phosphite defined by the following keto-enol tautomeric structures:

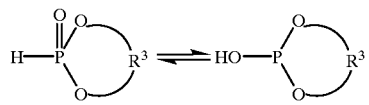

or a mixture thereof, where $R^1$ and $R^2$, which may be the same or different, are monovalent organic groups, and where $R^3$ is a divalent organic group.

14. The process of claim 13, where $R^1$ and $R^2$, are alkyl, cycloalkyl, substituted cycloalkyl, alkenyl, cycloalkenyl, substituted cycloalkenyl, aryl, allyl, substituted aryl, aralkyl, alkaryl, or alkynyl groups, with each group containing up to about 20 carbon atoms, and where $R^3$ is a alkylene, cycloalkylene, substituted alkylene, substituted cycloalkylene, alkenylene, cycloalkenylene, substituted alkenylene, substituted cycloalkenylene, arylene, or substituted arylene group, with each group containing up to about 20 carbon atoms.

15. The process of claim 11, where the aluminoxane is defined by one of the following formulas:

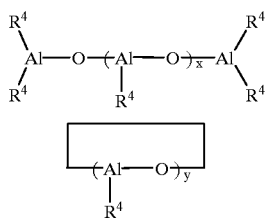

where x is an integer of 1 to about 100, y is an integer of 2 to about 100, and each $R^4$, which may be the same or different, is a mono-valent organic group.

16. The process of claim 15, where each $R^4$ is an alkyl, cycloalkyl, substituted cycloalkyl, alkenyl, cycloalkenyl, substituted cycloalkenyl, aryl, allyl, substituted aryl, aralkyl, alkaryl, or alkynyl group, with each group containing up to about 20 carbon atoms.

17. The process of claim 11, where said step of polymerizing the conjugated diene monomers is conducted in the presence of from about 0.01 to about 2 mmol of the iron-containing compound per 100 g of the conjugated diene monomers.

18. The process of claim 11, where said step of polymerizing the conjugated diene monomers is conducted in the presence of a molecular weight regulator.

19. The process of claim 11, where said conjugated diene monomers are 1,3-butadiene, isoprene, 1,3-pentadiene, 1,3-hexadiene, or mixtures thereof.

20. The process of claim 19, where said conjugated diene monomer is 1,3-butadiene.

* * * * *